(12) United States Patent
Ambrus et al.

(10) Patent No.: US 11,144,818 B2
(45) Date of Patent: Oct. 12, 2021

(54) NETWORK ARCHITECTURE FOR EGO-MOTION ESTIMATION

(71) Applicant: Toyota Research Institute, Inc., Los Altos, CA (US)

(72) Inventors: Rares A. Ambrus, San Francisco, CA (US); Vitor Guizilini, Santa Clara, CA (US); Sudeep Pillai, Mountain View, CA (US); Jie Li, Mountain View, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 91 days.

(21) Appl. No.: 16/654,498

(22) Filed: Oct. 16, 2019

(65) Prior Publication Data

US 2021/0004660 A1    Jan. 7, 2021

Related U.S. Application Data (60) Provisional application No. 62/871,046, filed on Jul. 5, 2019.

(51) Int. Cl.
*G06T 7/50* (2017.01)
*G06T 7/70* (2017.01)
(Continued)

(52) U.S. Cl.
CPC ......... *G06N 3/0454* (2013.01); *G06K 9/6259* (2013.01); *G06K 9/6262* (2013.01);
(Continued)

(58) Field of Classification Search
None
See application file for complete search history.

(56) References Cited

U.S. PATENT DOCUMENTS

2019/0057509 A1    2/2019 Lv et al.
2019/0139179 A1    5/2019 Wang et al.
(Continued)

FOREIGN PATENT DOCUMENTS

CN    109272493 A    1/2019

OTHER PUBLICATIONS

Zhao et al., "Learning monocular visual odometry with dense 3D mapping from dense 3D flow," International Conference on Intelligent Robots and Systems, 8 pages (2018).
(Continued)

*Primary Examiner* — Idowu O Osifade
(74) *Attorney, Agent, or Firm* — Christopher G. Darrow; Darrow Mustafa PC (57) ABSTRACT

System, methods, and other embodiments described herein relate to estimating ego-motion. In one embodiment, a method for estimating ego-motion based on a plurality of input images in a self-supervised system includes receiving a source image and a target image, determining a depth estimation $D_t$ based on the target image, determining a depth estimation $D_s$ based on a source image, and determining an ego-motion estimation in a form of a six degrees-of-freedom (6 DOF) transformation between the target image and the source image by inputting the depth estimations ($D_t$, $D_s$), the target image, and the source image into a two-stream network architecture trained to output the 6 DOF transformation based at least in part on the depth estimations ($D_t$, $D_s$), the target image, and the source image.

17 Claims, 5 Drawing Sheets

(51) Int. Cl.
*G06K 9/62* (2006.01)
*G06N 3/04* (2006.01)
*G06N 3/08* (2006.01)

(52) U.S. Cl.
CPC ............... *G06N 3/08* (2013.01); *G06T 7/50* (2017.01); *G06T 7/70* (2017.01); *G06T 2207/20081* (2013.01); *G06T 2207/30244* (2013.01)

(56) References Cited

U.S. PATENT DOCUMENTS

| | | | | |
|---|---|---|---|---|
| 2019/0147340 | A1* | 5/2019 | Zhang | G06N 3/082 706/25 |
| 2020/0041276 | A1* | 2/2020 | Chakravarty | G01C 21/32 |
| 2020/0265590 | A1* | 8/2020 | Daniilidis | G06T 7/269 |
| 2020/0302634 | A1* | 9/2020 | Pollefeys | G06T 7/70 |

OTHER PUBLICATIONS

Agrawal & Chellappa, "Robust Ego-Motion Estimation and 3D Model Refinement Using Depth Based Parallax Model," International Conference on Image Processing, 4:2483-2486 vol. 4 (2004).
Teng et al., "Occlusion-Aware Unsupervised Learning of Monocular Depth, Optical Flow and Camera Pose with Geometric Constraints," Future Internet 2018, 10, 92; doi:10.3390/fi10100092.
Godard et al., "Unsupervised Monocular Depth Estimation with Left-Right Consistency," 14 pages, arXiv:1609.03677v3 [cs.CV] Apr. 12, 2017.
Godard et al., "Digging Into Self-Supervised Monocular Depth Estimation," 18 pages, arXiv:1806.01260v4 [cs.CV] Aug. 17, 2019.
Pillai et al., "SuperDepth: Self-Supervised, Super-Resolved Monocular Depth Estimation," 7 pages, arXiv:1810.01849v1 [cs.CV] Oct. 3, 2018.
Eigen et al., "Depth Map Prediction from a Single Image using a Multi-Scale Deep Network," 9 pages, Advances in Neural Information Processing Systems, pp. 2366-2374 (2014).
Zhou et al., "Unsupervised Learning of Depth and Ego-Motion from Video," 2017 IEEE Conference on Computer Vision and Pattern Recognition, p. 1851-1860 (2017).
Mahjourian et al., "Unsupervised Learning of Depth and Ego-Motion from Monocular Video Using 3D Geometric Constraints," Proceedings of the IEEE Conference on Computer Vision and Pattern Recognition, p. 5667-5675 (2018).
Li et al., "UnDeepVo: Monocular Visual Odometry through Unsupervised Deep Learning," 6 pages, arXiv:1709.06841v2 [cs.CV] Feb. 21, 2018.
Teed & Deng, "DeepV2D: Video to Depth with Differentiable Structure from Motion," p. 1-14, arXiv:1812.04605v2 [cs.CV] Apr. 19, 2019.
Simonyan & Zisserman, "Two-Stream Convolutional Networks for Action Recognition in Videos," Proceedings of the 27th International Conference on Neural Information Processing Systems, vol. 1, p. 568-576 (2014).
Carreira & Visserman, "Quo Vidas, Action Required? A New Model and the Kinetics Dataset," IEEE Conference on Computer Vision and Pattern Recognition, 10 pages (2017).

* cited by examiner

NETWORK ARCHITECTURE FOR EGO-MOTION ESTIMATION

CROSS-REFERENCE TO PRIORITY APPLICATION

This application claims priority to U.S. Provisional Patent Application No. 62/871,046, filed Jul. 5, 2019, which is commonly assigned herewith and the contents of which are incorporated herein in entirety by reference, with priority claimed for all commonly disclosed subject matter.

TECHNICAL FIELD

The subject matter described herein relates, in general, to systems and methods for estimating ego-motion, and, more particularly, to a self-supervised system for ego-motion estimation including a two-stream network architecture.

BACKGROUND

Visual ego-motion is a fundamental capability in mobile robots, used in many tasks such as perception, navigation, and planning. The ability to reconstruct the structure of a scene with high-accuracy for ego-motion determination is fundamental to ensuring robust autonomous navigation.

LIDAR's are typically the sensor of choice for ego-motion determination for autonomous vehicle developers and manufacturers. LIDAR's can provide reliable and accurate range data at large distances and can be used for a wide variety of applications within the autonomous vehicle ecosystem, e.g. mapping, localization, object detection and safety critical evasive maneuvers. However, the cost of using LIDAR's can pose an economic challenge for global scale deployments. Accordingly, a shift to replace LIDAR sensors with less expensive camera sensors, e.g., a monocular camera, would present a possible economic solution.

Traditional approaches to monocular three-dimensional (3D) reconstruction have relied on hand-engineered features to reliably reconstruct scenes from camera imagery. However, deep learning approaches have shown potential to provide a solution that no longer relies on hand-engineered features for further advancements in 3D reconstruction. Deep learning approaches are particularly applicable in ill-posed regimes (e.g., reconstructing textureless regions or geometrically under-determined regimes).

Training deep learning systems in the self-supervised regime is a particularly promising direction of research, as it has the potential to alleviate the burden of having to label the world. A number of related methods have addressed the ego-motion estimation component of the self-supervised learning of depth and pose using a number of architectures or changes to the loss function. However, there is significant room for improvement, particularly relating to network architecture and training, as no complete solution has yet emerged.

SUMMARY

The disclosed systems and methods relate to advancing and improving the task of learning depth and ego-motion estimation from streams of unlabeled red-green-blue (RGB) images in a self-supervised regime.

In one embodiment, a self-supervised system for estimating ego-motion based on a plurality of input images, includes one or more processors, a memory, communicably connected to the one or more processors and storing network instructions and a depth module including instructions that when executed by the one or more processors cause the one or more processors to determine a depth estimation $D_t$ based on a target image and a depth estimation $D_s$ based on a source image; and a pose module including instructions that when executed by the one or more processors cause the one or more processors to determine an ego-motion estimation in a form of a six degrees-of-freedom (6 DOF) transformation between the target image and the source image by inputting the depth estimations ($D_t$, $D_s$), the target image, and the source image into a two-stream network architecture trained to output the 6 DOF transformation based at least in part on the depth estimations ($D_t$, $D_s$), the target image, and the source image.

In another embodiment, a method for estimating ego-motion based on a plurality of input images in a self-supervised system, includes receiving a source image and a target image, determining a depth estimation $D_t$ based on the target image, determining a depth estimation $D_s$ based on a source image, and determining an ego-motion estimation in a form of a six degrees-of-freedom (6 DOF) transformation between the target image and the source image by inputting the depth estimations ($D_t$, $D_s$), the target image, and the source image into a two-stream network architecture trained to output the 6 DOF transformation based at least in part on the depth estimations ($D_t$, $D_s$), the target image, and the source image.

In another embodiment, a non-transitory computer-readable medium for estimating ego-motion based on a plurality of input images in a self-supervised system includes instructions that, when executed by one or more processors, cause the one or more processors to receive a source image and a target image, determine a depth estimation $D_t$ based on the target image, determine a depth estimation $D_s$ based on a source image, and determine an ego-motion estimation in a form of a six degrees-of-freedom (6 DOF) transformation between the target image and the source image by inputting the depth estimations ($D_t$, $D_s$), the target image, and the source image into a two-stream network architecture trained to output the 6 DOF transformation based at least in part on the depth estimations ($D_t$, $D_s$), the target image, and the source image.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with facilitating and improving the task of learning depth and ego-motion estimation from streams of unlabeled RGB images in a self-supervised regime are disclosed. The disclosed embodiments address, among other things, one of the key components of self-supervised learning from unlabeled RGB videos: ego-motion estimation. Specifically, the disclosed embodiments replace conventional ego-motion estimating networks with a two-stream network that processes both RGB and depth streams simultaneously to learn an ego-estimation model. The disclosed two-stream network has a higher capacity to learn ego-motion, which in turn leads to increased depth performance and scene interpretation.

The disclosed embodiments can be applied, for example, in robot navigational systems, autonomous vehicle systems, or the like. As mentioned above, conventional vehicular platforms often utilize LIDAR sensors to build a 3D spatial representation of the local world around it. While such sensors have shown strong performance, especially in high-dynamic range regimes, they are generally limited due to the sparse nature of the 3D reconstructions produced. Cameras, on the other hand, can provide both a dense semantic and spatial understanding of the scene by reasoning across space (stereo, multi-camera) and time (multi-view reconstruction). The disclosed embodiments leverage these advantages and provide a mechanism that can self-supervise the task of image-based metric depth estimation by bootstrapping geometric constraints inherent in robots and/or autonomous vehicles.

Additional benefits of the disclosed embodiments include 3D metric reconstruction and increased understanding of scenes through monocular depth and ego-motion estimation from unlabeled images. The ability to bootstrap and learn a metric depth network from monocular camera sensors also benefits fusion stages for 3D spatial reconstruction (e.g., either from single/multi-view monocular imagery, or from both LIDAR and monocular imagery combined).

Furthermore, while many learning-based methods tend to rely on model-regularization policies to avoid the overfitting concern, the disclosed embodiments introduce a sparsity-inducing and aggressive image augmentation scheme that is specifically targeted to regularizing camera ego-motion learning and preventing the network from overfitting. The disclosed aggressive augmentation policy induces sparsity in the features learned by the pose-network and provides a simple-yet-effective mechanism to learn a sufficiently-sparse network for pose-estimation.

Figure 1:
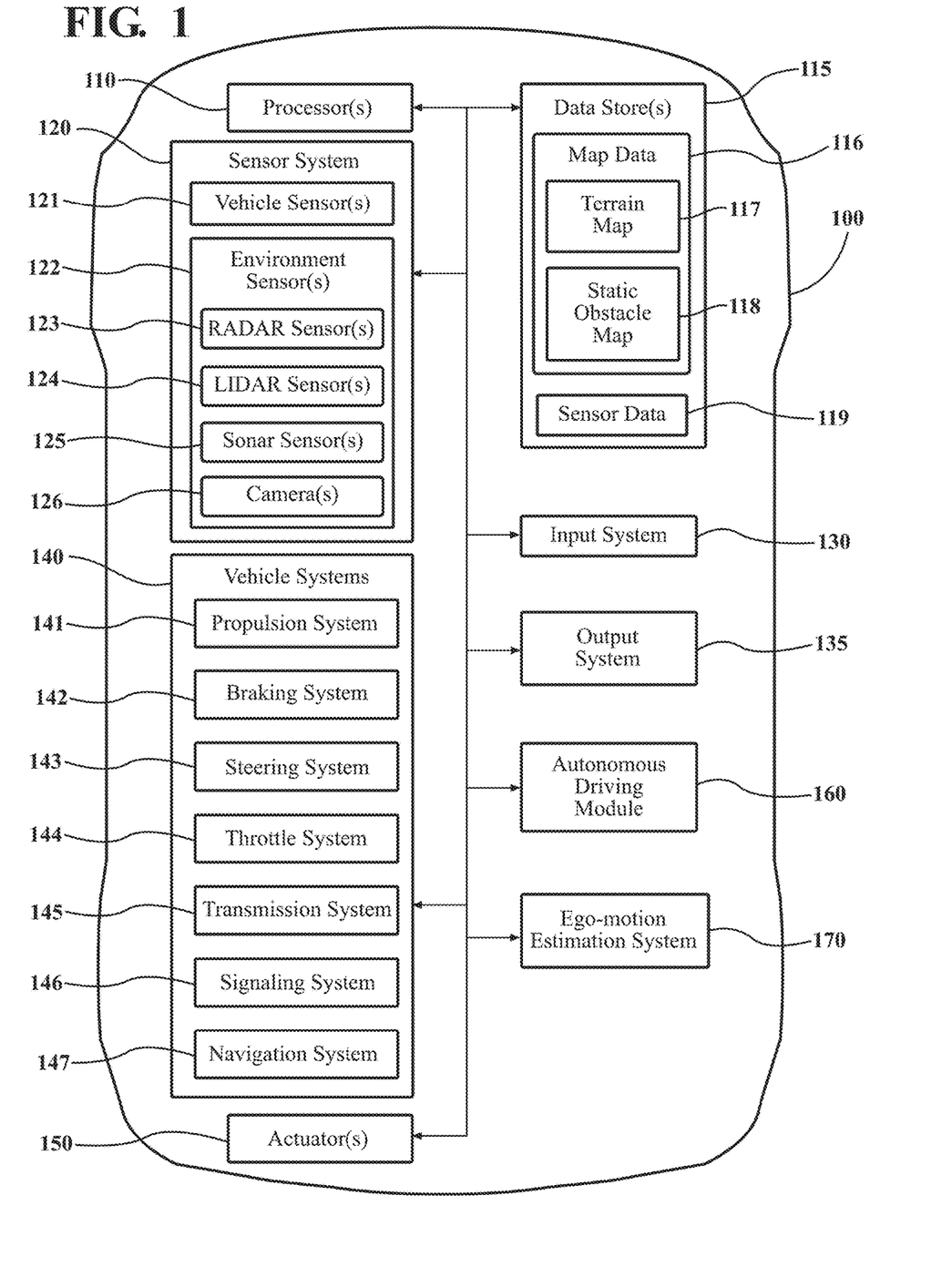
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, proceeds through an environment according to assessed aspects of the environment, and thus benefits from the functionality discussed herein. Moreover, in further approaches, the noted systems (e.g., system 170) and methods can be implemented independently of a mobile platform such as a vehicle and thus may be statically mounted.

As shown in FIG. 1, the vehicle 100 includes multiple elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 1-5 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes a self-supervised ego-motion estimation system 170 (hereinafter, "ego-motion estimation system 170") that functions to process monocular RGB images, which may be unlabeled, and provide an ego-motion estimate, e.g., in the form of a six degrees-of-freedom (6 DOF) transformation. Moreover, while depicted as a standalone component, in one or more embodiments, the ego-motion estimation system 170 can be integrated with the autonomous driving module 160, the camera 126, or another component of the vehicle 100. The noted functions and methods will become more apparent in the following discussion of the figures.

Figure 2:
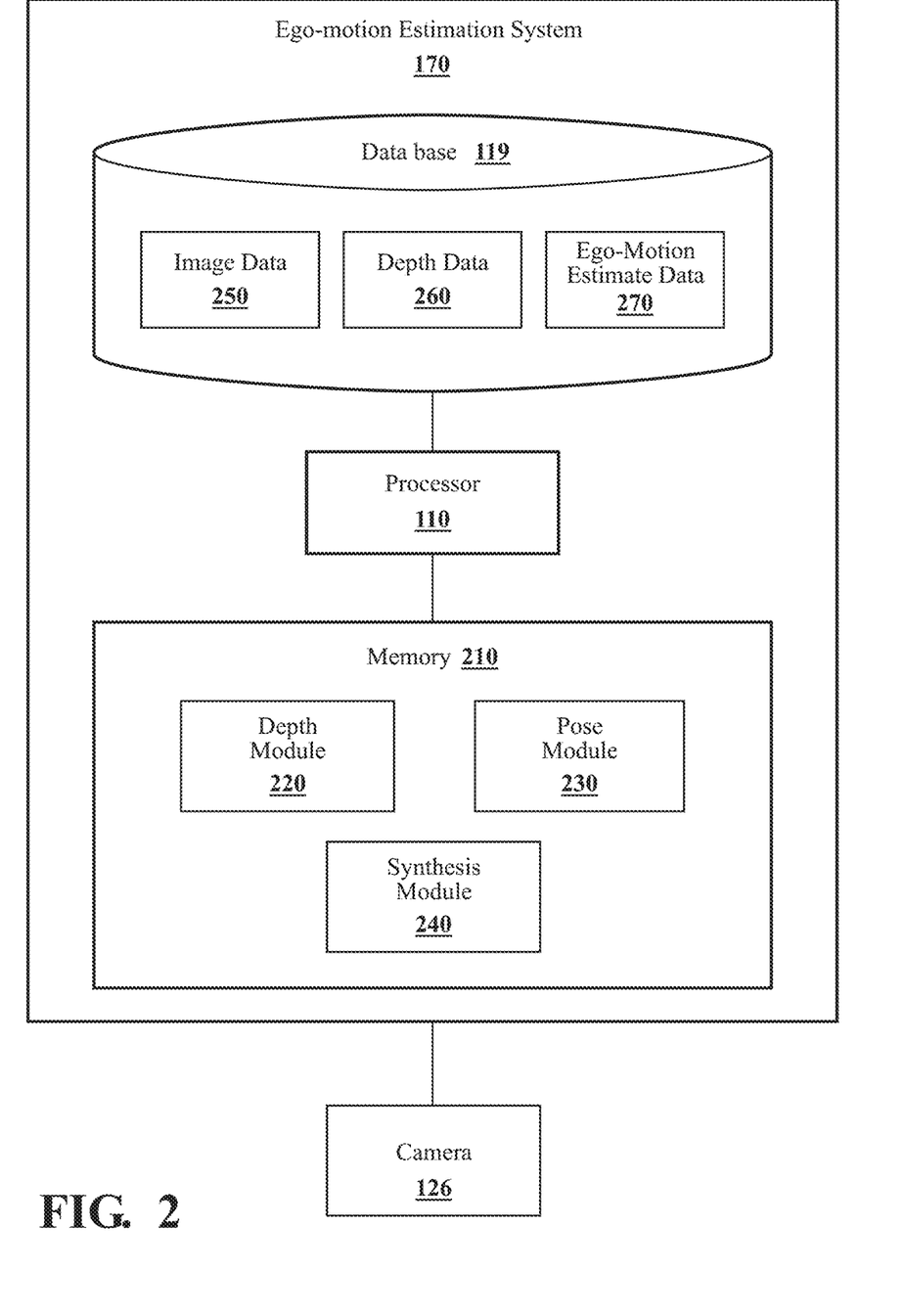
FIG. 2 illustrates one embodiment of a self-supervises ego-motion estimation system according to the disclosed embodiments.

With reference to FIG. 2, one embodiment of a vehicular implementation of the ego-motion estimation system 170 of FIG. 1 is illustrated. The ego-motion estimation system 170 is shown as including a processor 110 and database 119 from the vehicle 100 of FIG. 1. Accordingly, the processor 110 may be a part of the ego-motion estimation system 170, the ego-motion estimation system 170 may include a separate processor from the processor 110 of the vehicle 100 or the ego-motion estimation system 170 may access the processor 110 through a data bus or another communication path.

The ego-motion estimation system 170 includes a database 119 that stores, among other things, image data 250 (e.g., images/video frames captured by camera 126), corresponding depth data 260 (e.g., generated by the depth module 220) and ego-motion estimate data 270 (e.g., generated by the pose module 230), as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220, 230, and 240. The database 119 is configured with routines that can be executed by the processor 110 for analyzing stored data, providing stored data, organizing stored data, and so on. Thus, in one embodiment, the database 119 stores data described above (as well as other data) used by the modules 220, 230, and 240 in executing various functions.

Additionally, the ego-motion estimation system 170, in one or more embodiments, includes a memory 210 that stores a depth module 220, a pose module 230, and a synthesis module 240. The memory 210 can be constructed as a random-access memory (RAM), read-only memory (ROM), a hard-disk drive, a flash memory, or other suitable memory for storing the modules 220, 230 and 240. The modules 220, 230 and 240 are, for example, constructed as computer-readable instructions that when executed by the processor 110 cause the processor 110 to perform the various functions disclosed herein.

The image data 250 can include, for example, two or more RGB monocular images (e.g., a source image $I_s$ and a temporally subsequent target image $I_t$) captured in sequential time frames by the camera 126 and encompassing a field-of-view about the vehicle 100 of at least a portion of the surrounding environment. That is, the image data 250 is, in one approach, generally limited to a subregion of the surrounding 360 environment. As such, the image data 250 may be of a forward facing (i.e., direction of travel) 60, 90, 120-degree FOV, a rear/side facing FOV, or some other subregion as defined by the characteristics of the camera 126. In further aspects, the camera 126 can be implemented as an array of two or more cameras that capture multiple images of the surrounding environment and stitch the images together to form a comprehensive 360-degree view of the surrounding environment.

In any case, the image data 250 itself can include visual data of the FOV that is encoded according to an image standard (e.g., codec) associated with the camera 126. In general, characteristics of the camera 126 and the image standard can define a format of the image data 250. Thus, while the particular characteristics can vary according to different implementations, in general, the image data 250 includes monocular images having a defined resolution (i.e., height and width in pixels) and format. The monocular images are generally RGB visible light images. In contrast to stereo images that may integrate left and right images from separate cameras mounted side-by-side, the monocular images do not include explicit depth information such as disparity maps derived from comparing stereo images pixel-by-pixel.

The image data 250 is provided as input to the depth module 220. The depth module 220 is generally constructed including instructions that function to control the processor 110 to determine depth data 260 for the image data 250. For example, in one or more embodiments the depth module 220 outputs depth data 260 including a depth estimation $\hat{D}_s$ for a source image $I_s$ from the image data 250 and a depth estimation $\hat{D}_t$ for a temporally adjacent target image $I_t$ from the image data 250. In one or more embodiments, the depth module 220 can be implemented, for example, using an encoder-decoder network architecture with skip connections from the encoder's activation blocks and outputs depths at four scales. The depth at each scale can be upsampled by a factor of two and concatenated with the decoder features to help resolve the depth and the next scale. In other embodiments, the depth module 220 can implement one or more conventional depth estimation networks to obtain the depth data 260 (i.e., depth estimations $\hat{D}_s$, $\hat{D}_t$) using techniques that are known to one of ordinary skill in the art.

The depth data 260 and the image data 250 are provided as input to the pose module 230. The pose module 230 is constructed including instructions that function to control the processor 110 to determine an ego-motion estimate 270, e.g., based at least in part on the image data 250 (i.e., source image $I_s$ and target image $I_t$) and the depth data 260 (i.e., depth estimations $\hat{D}_s$, $\hat{D}_t$).

Figure 3:
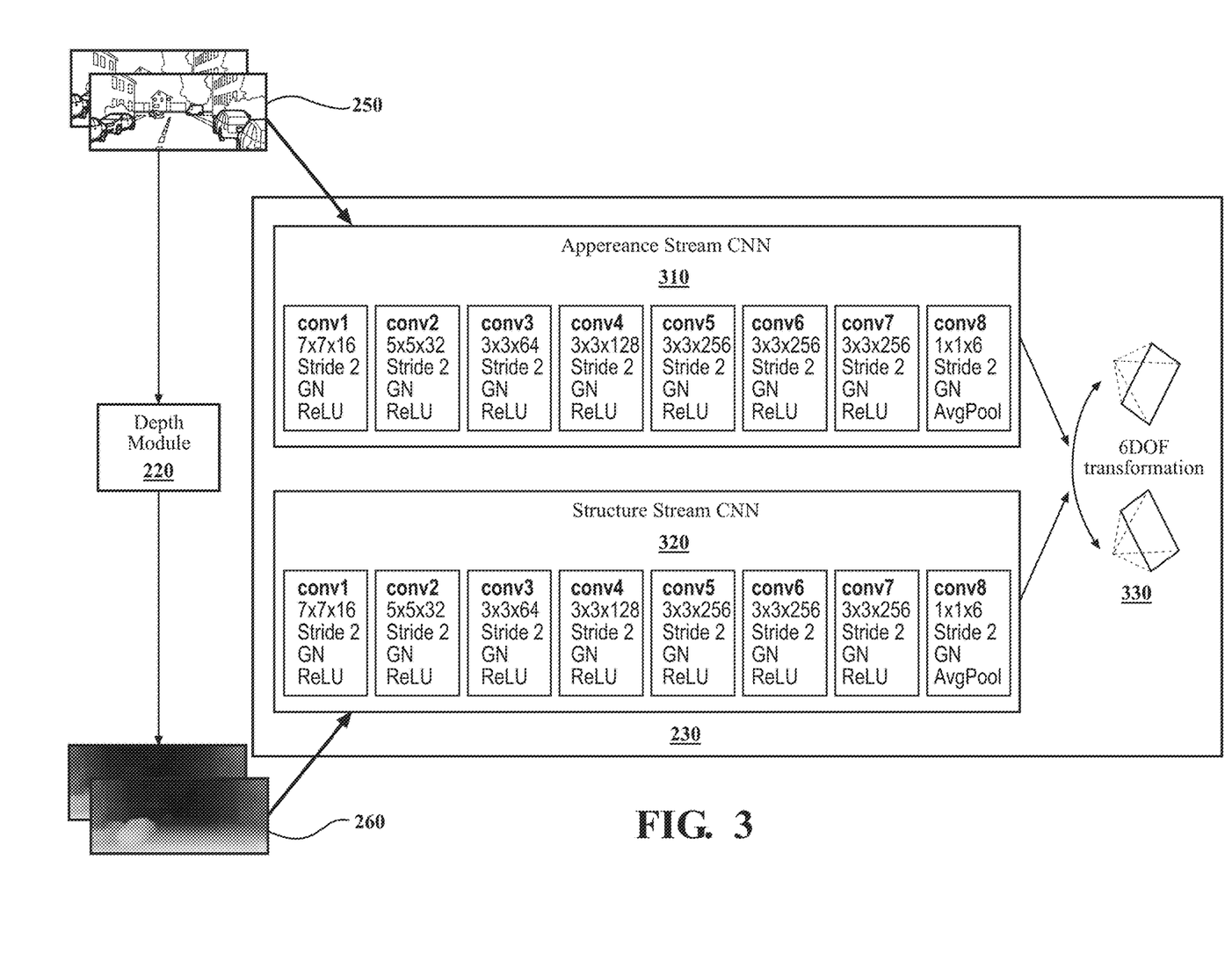
FIG. 3 illustrates an example network architecture for a pose module according to the disclosed embodiments.

FIG. 3 shows an example network architecture for the pose module 230. In one or more embodiments the pose module 230 can be implemented in a two-stream network architecture including an appearance stream convolution neural network ("CNN") 310 for processing image data 250 and a structure stream CNN 320 for processing depth estimate data 260. In one or more embodiments, each CNN 310, 320, contains eight convolutional layers including a final average pooling layer and outputs an ego-motion estimation in the form of a 6-DOF transformation 330 between the input frames. The 6-DOF transformation 330 is represented as six numbers (x, y, z) for the translation and (alpha, beta, gamma) corresponding to roll, pitch and yaw angles for the rotation using the Euler parameterization. Receiving two separate modalities (i.e., image and depth) allows the pose module 230 to learn both appearance and geometry features, leading to improved results.

The synthesis module 240 is constructed including instructions that function to control the processor 110 synthesize a predicted image $\hat{I}_t$ based at least in part on input of the source image $I_s$, the ego-motion estimation, and the target depth estimation $\hat{D}_t$. The synthesized image $\hat{I}_t$ is compared against the source image $I_s$ to determine photometric loss, which is reduced in a self-supervised learning optimization process of the ego-motion estimation system 170, as will be described further below.

Figure 4:
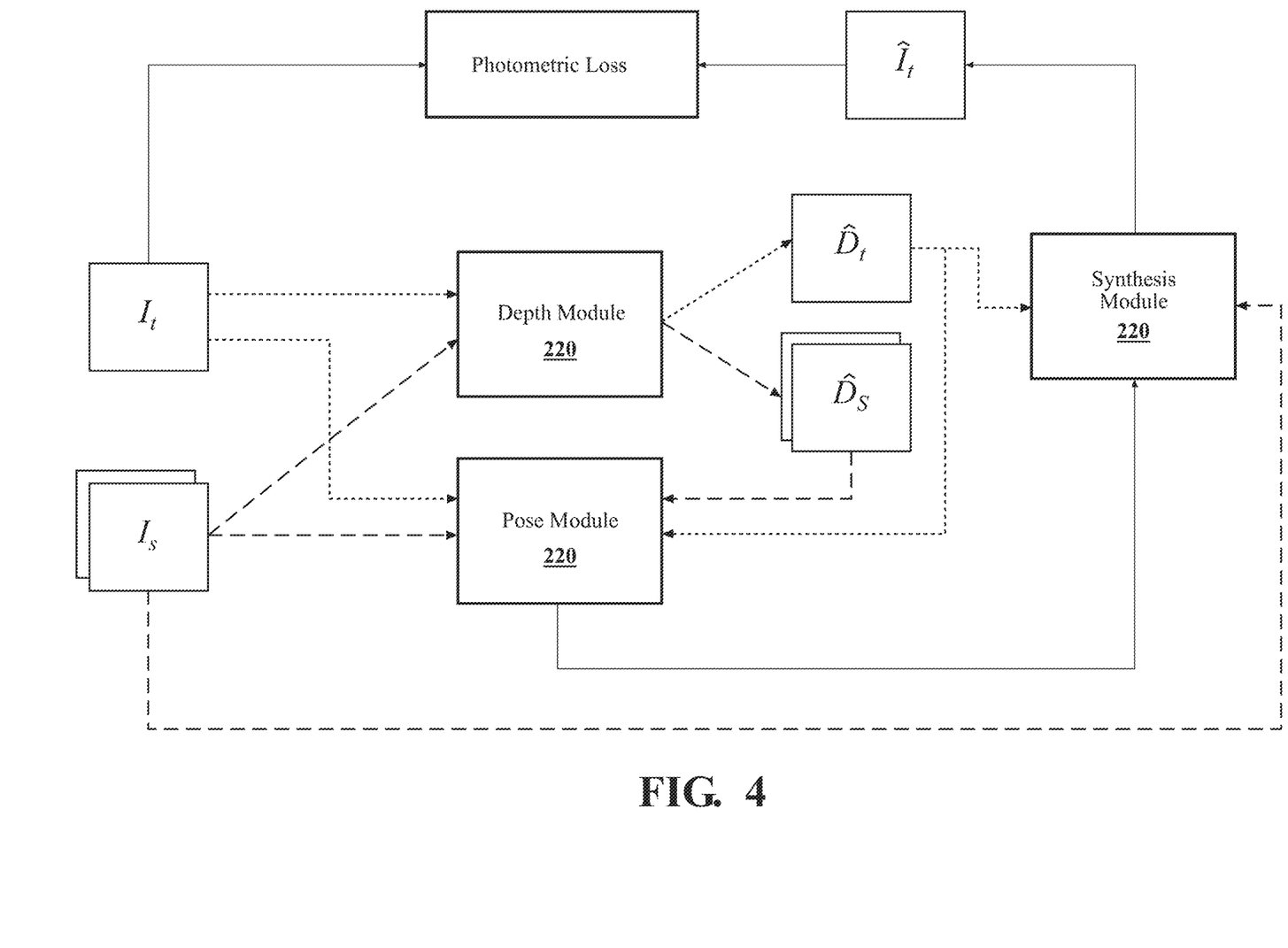
FIG. 4 illustrates an example network architecture of an ego-motion estimation system according to the disclosed embodiments.

FIG. 4 shows an example network architecture 400 of the ego-motion estimation system 170 according to the disclosed embodiments. As described above, the depth module 220 receives a source image $I_s$ and target image $I_t$ as input and outputs a depth estimation $\hat{D}_t$ for the target image $I_t$ and a depth estimation $\hat{D}_s$ for the source image. The pose module 230 receives the source image $I_s$, target image $I_t$, depth estimation $\hat{D}_s$, and depth estimation $\hat{D}_t$ as input and outputs an ego-motion estimation in the form of a 6-DOF transformation between the source image $I_s$ and target image $I_t$. The synthesis module 240 receives the ego-motion estimation, the source image $I_s$, and the depth estimation $\hat{D}_t$ as input and synthesizes a predicted image $\hat{I}_t$, which is compared against the target image $I_t$ to determine photometric loss for the ego-motion estimation system 170.

The self-supervised learning problem of the ego-motion estimation system 170 may be defined as the task of recovering the following functions:

(i) $f_d$: I→D (ii) $f_x$: ($I_t$, $D_t$, $I_s$, $D_s$)→$x_{t→s}$ where (i) maps an RGB image I to its corresponding depth D, and (ii) estimates the six degrees-of-freedom (6-DOF) ego-motion transformation between a target image $I_t$ and (temporarily adjacent) source image $I_s$, the 6-DOF transformation defined as:

$$x_{t \to s} = \begin{pmatrix} R & t \\ 0 & 1 \end{pmatrix} \in SE(3) \qquad \text{(iii)}$$

Unlike conventional methods, the disclosed ego-motion estimation system 270 includes a two-stream network (e.g., FIG. 3) that receives RGB image data and depth information as input and fuses the input into a unified pose output. As shown in FIG. 4, using the inferred depth $\hat{D}_t$ and the estimated ego-motion, the synthesis module 240 transforms $\hat{D}_t$ into a reference frame of $I_s$ and synthesizes a predicted image $\hat{I}_t$ from $I_s$ in a differentiable manner.

The disclosed ego-motion estimation system 270 formulates optimization as a minimization of the photometric loss (i.e., photometric reprojection error) between the target image $I_t$ and the synthesized predicted image $\hat{I}_t$. In one or more embodiments, the loss function contains an appearance based matching term, a depth smoothness/regularization as well as a robustness component which helps account for errors due to occlusions and dynamic objects.

The appearance based matching loss between two images can be defined as a linear combination between an L1 loss and a structural similarity (SSIM) patch-based loss:

$$L_p(I_t, \hat{I}_t) = \alpha \frac{1 - SSIM(I_t, \hat{I}_t)}{2} + (1-\alpha)\|I_t - \hat{I}_t\| \quad \text{(Eq. 1)}$$

The photometric loss as defined in Eq. 1 is susceptible to errors induced by occlusions or dynamic objects. While conventional methods clip the photometric errors above a percentile to filter out errors, the disclosed ego-motion estimation system 270 obtains better results by using an auto-masking approach. Given target image $I_t$, source image $I_s$, and synthesized predicted image $\hat{I}_t$ a masking term $M_r$ can be defined as:

$$M_r(I_t, I_s, \hat{I}_t) = L_p(I_t, I_s) < L_p(I_t, \hat{I}_t) \quad \text{(Eq. 2)}$$

$M_r$ is a robust mask that filters out stationary pixels and pixels with little photometric variation. Finally, the robust appearance matching loss between target image $I_t$ and context images $I_s$ can be defined as:

$$L_r(I_t, I_s) = \min_{s \in S} M_r(I_t, I_s, \hat{I}_t) \cdot L_p(I_t, \hat{I}_t) \quad \text{(Eq. 3)}$$

$L_r$ is a per-pixel loss. The term $M_r$ is used to filter out static pixels between $I_t$ and $I_s$, and subsequently the loss term with the lowest value across all context images in $I_s$ is selected.

The disclosed ego-motion estimation system 270 can also incorporate a multi-scale edge-aware term, i.e., a smoothness loss $L_s$, to regularize the depth in texture-less regions, where:

$$L_s(\hat{D}_t) = |\delta_x \hat{D}_t| e^{-|\delta_x I_t|} + |\delta_y \hat{D}_t| e^{-|\delta_y I_t|} \quad \text{(Eq. 4)}$$

Finally, the loss L between $I_t$ and $I_s$ can be optimized as:

$$L(I_t, I_s) = L_r(I_t, I_s) \odot M_r + \lambda L_s(\hat{D}_t) \quad \text{(Eq. 5)}$$

Prior to computing the loss L, the depth maps across all the scales can be upsampled to the resolution of the input image $I_t$. This step can be performed using a simple upsampling operation. Additional gains in depth can be obtained by using subpixel convolutions or packing and unpacking layers through a differentiable pixel-shuffle operation.

The loss L can be used for training the CNNs 310, 320 (FIG. 3). That is, by utilizing view synthesis as supervision, the entire framework 400 (FIG. 4) can be trained in an unsupervised manner from videos.

A downside of a more expressive model as presented in the ego-motion estimation system 270 above is that it tends to overfit during training. While this attribute can be desirable when the aim is to obtain the best depth results, when optimizing for the performance of the ego motion additional regularization can ensure that the ego-motion component performs well at test time and does not overfit to the training set. As an interesting by-product, applicants have discovered that this can lead to a decrease in the performance of the depth network.

To mitigate overfitting, in one or more embodiments the above-described model implemented in the ego-motion estimation system 170 can be trained on a training dataset including a plurality of images that have been subjected to an aggressive data augmentation step to (i) regularize the ego-motion estimation system 170 during training and (ii) force the ego-motion estimation system 170 to learn sparser features, which improve its overall performance. The augmentation step can include controlling/tuning the following hyperparameters: (i) the percentage of the image to be covered by random noise and (ii) the size of each noise patch. For example, in one or more embodiments the augmentation step may apply a noise augmentation-level of 20%-40% coverage and use random noise patches sized at 81×81 and 101×101. It should be understood that these hyperparameters are provided as an example for an embodiment. Specific tuning of the hyperparameters can be controlled per implementation to reduce the likelihood of overfitting to the training dataset.

Figure 5:
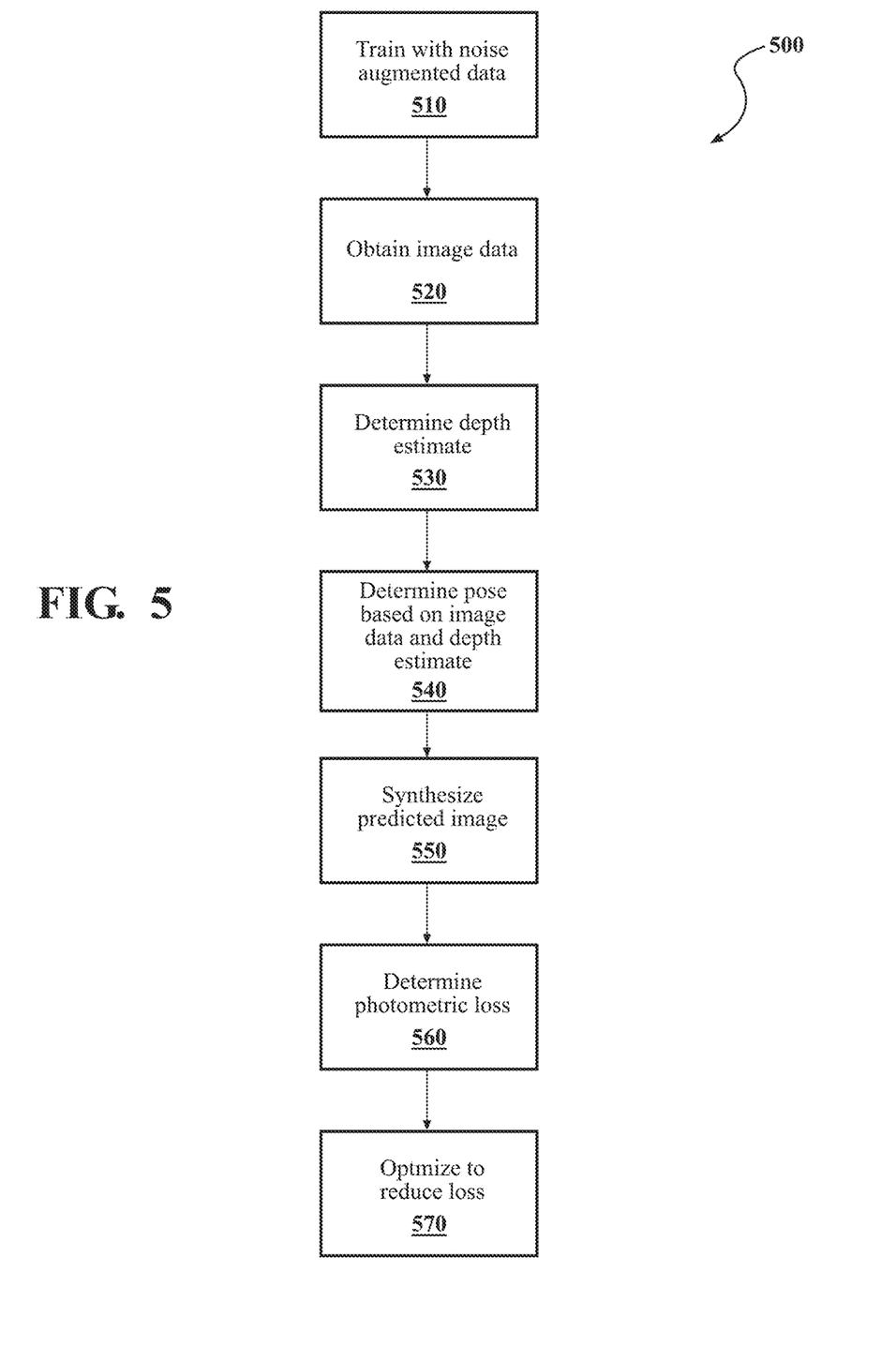
FIG. 5 illustrates a flow chart of a method of estimating an ego-motion according the disclosed embodiments.

FIG. 5 illustrates a flowchart of a method 500 of generating an ego-motion estimate according to the disclosed embodiments. Method 500 will be discussed from the perspective of the ego-motion estimation system 170 of FIGS. 1-4. While method 500 is discussed in combination with the ego-motion estimation system 170, it should be appreciated that the method 500 is also not limited to being implemented within the ego-motion estimation system 170 but is instead one example of a system that may implement the method 500.

At operation 510, the ego-motion estimation system 170 can trained. In one embodiment, the ego-motion estimation system 170 can be trained using a dataset including images that have been subjected to noise augmentation to reduce overfitting. For example, the noise augmentation can be implemented by using noise patches sized at 81×81 and/or 101×101 applied at a noise augmentation-level of 20%-40% coverage to one or more of the images in the dataset.

At operation 520, the ego-motion estimation system 170 obtains image data 250. For example, in one or more embodiments the camera 126 of vehicle 100 captures two or more images in adjacent, sequential time frames, e.g., a source image $I_s$ and a target image $I_t$.

At operation 530, the ego-motion estimation system 170, e.g., depth module 220, determines a depth estimation $D_t$ on a target image and a depth estimation $D_s$ based on a source image. For example, in one or more embodiments, the depth module 220 can be implemented, for example, using an encoder-decoder network architecture with skip connections from the encoder's activation blocks and that outputs depths at four scales.

At operation 540, the ego-motion estimation system 170, e.g., pose module 230, determines an ego-motion (pose) estimation in a form of a six degrees-of-freedom (6 DOF) transformation between the target image and the source image based at least in part on inputs including depth estimations ($D_t$, $D_s$), the target image, and the source image. In one or more embodiments, the pose module 230 can be implemented as a two-stream network architecture including an appearance stream CNN 310 for processing image data 250 and a structure stream CNN 320 for processing depth estimate data 260. In one or more embodiments, each CNN 310, 320, contains eight convolutional layers including a final average pooling layer. The outputs of the CNNs 310, 320 are fused to generate an ego-motion estimation in the form of a 6-DOF transformation 330. The fusion can be implemented, for example, by averaging or another fusing technique.

At operation 550, the ego-motion estimation system 170, e.g., synthesizer module 240, synthesizes a predicted image $\hat{I}_t$ based at least in part on the ego-motion estimation, the depth estimate $D_t$ and the source image.

At operation 560, the ego-motion estimation system 170 determines a photometric loss L between the predicted image $\hat{I}_t$ and the target image $I_t$.

At operation 570, the ego-motion estimation system 170 adjusts system parameters (e.g., weights and biases in CNNs of the depth module 220 and/or the pose module 230) to reduce or minimize a loss L defined by a loss function, e.g., Equation 5.

Accordingly, the disclosed self-supervised ego-motion estimation system 170 can improve the operation of a robot or a vehicle 100, particularly an autonomous vehicle or a vehicle that includes autonomous or semi-autonomous features for navigating through an environment.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126, e.g, one or more monocular cameras. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the ego-motion estimation system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110, the ego-motion estimation system 170, and/or the autonomous driving module(s) 160 can be operatively connected to communicate with the various vehicle systems 140 and/or individual components thereof. For example, returning to FIG. 1, the processor(s) 110, the ego-motion estimation system 170, and/or the autonomous driving module(s) 160 can be in communication to send and/or receive information from the various vehicle systems 140 to inform or control the movement, speed, maneuvering, heading, direction, etc. of the vehicle 100. The processor(s) 110 and/or the autonomous driving module(s) 160 may control some or all of these vehicle systems 140.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the ego-motion estimation system 170 can be configured to determine travel path(s) and determine current autonomous driving maneuvers for the vehicle 100, future autonomous driving maneuvers and/or modifications to current autonomous driving maneuvers based on data acquired by the sensor system 120 and/or ego-motion estimation system 170, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A self-supervised system for estimating ego-motion based on a plurality of input images, comprising:
   one or more processors;
   a memory, communicably connected to the one or more processors and storing:
   a depth module including instructions that when executed by the one or more processors cause the one or more processors to determine a depth estimation $D_t$ based on a target image and a depth estimation $D_s$ based on a source image; and
   a pose module including instructions that when executed by the one or more processors cause the one or more processors to determine an ego-motion estimation in a form of a six degrees-of-freedom (6 DOF) transformation between the target image and the source image by inputting the depth estimations ($D_t$, $D_s$), the target image, and the source image into a two-stream network architecture trained to output the 6 DOF transformation based at least in part on the depth estimations ($D_t$, $D_s$), the target image, and the source image,
   the two-stream network architecture comprising:
      an appearance stream convolution neural network (CNN) that convolves the source image and the target image; and
      a structure stream CNN that convolves the depth estimations ($D_t$, $D_s$),
   wherein the pose module further includes instructions to fuse outputs of the appearance stream CNN and the structure stream CNN into a unified output to produce the 6 DOF transformation.

2. The self-supervised system of claim 1, further comprising:
   a synthesizer module including instructions that when executed by the one or more processors cause the one or more processors to synthesize a predicted image based at least in part on the ego-motion estimation, the depth estimation $D_t$ and the source image,
   wherein the memory further stores instructions to compare the predicted image against the target image to determine photometric loss for the self-supervised system and adjust parameters of the self-supervised system to reduce the photometric loss by optimizing an associated loss function.

3. The self-supervised system of claim 2, wherein the loss function includes an appearance based matching term defined as a linear combination between an L1 loss and a structural similarity (SSIM) patch-based loss, an edge-aware smoothness loss term, and a mask term that filters out stationary pixels and pixels with little photometric variation.

4. The self-supervised system of claim 1, wherein the self-supervised system is trained using training data that is augmented with noise.

5. The self-supervised system of claim 4, wherein the noise comprises random noise patches sized 81×81 to 101×101 at a noise augmentation level of 20%-40% coverage.

6. The self-supervised system of claim 1, wherein the source image and the target image are both monocular images.

7. A method for estimating ego-motion based on a plurality of input images in a self-supervised system, comprising:
   receiving a source image and a target image;
   determining a depth estimation $D_t$ based on the target image;
   determining a depth estimation $D_s$ based on a source image;

determining an ego-motion estimation in a form of a six degrees-of-freedom (6 DOF) transformation between the target image and the source image by inputting the depth estimations ($D_t$, $D_s$), the target image, and the source image into a two-stream network architecture trained to output the 6 DOF transformation based at least in part on the depth estimations ($D_t$, $D_s$), the target image, and the source image, wherein determining the ego-motion estimation comprises:

convolving the source image and target image via an appearance stream convolution neural network (CNN);

convolving the depth estimations ($D_t$, $D_s$) via a structure stream CNN; and fusing outputs of the appearance stream CNN and the structure stream CNN into a unified output to produce the 6 DOF transformation.

8. The method of claim 7, further comprising:

synthesizing a predicted image based at least in part on the ego-motion estimation, the depth estimation $D_t$ and the source image;

comparing the predicted image against the target image to determine systemic photometric loss; and adjusting parameters of the self-supervised system to reduce the systemic photometric loss by optimizing an associated loss function.

9. The method of claim 8, wherein the loss function includes an appearance based matching term defined as a linear combination between an L1 loss and a structural similarity (SSIM) patch-based loss, an edge-aware smoothness loss term, and a mask term that filters out stationary pixels and pixels with little photometric variation.

10. The method of claim 7, further comprising training a network implementation of the method using training data that is augmented with noise.

11. The method of claim 10, wherein the noise comprises random noise patches sized 81×81 to 101×101 at a noise augmentation level of 20%-40% coverage.

12. The method of claim 7, wherein the source image and the target image are both monocular images.

13. A non-transitory computer-readable medium for estimating ego-motion based on a plurality of input images in a self-supervised system, including instructions that, when executed by one or more processors, cause the one or more processors to:

receive a source image and a target image;

determine a depth estimation $D_t$ based on the target image;

determine a depth estimation $D_s$ based on a source image;

determine an ego-motion estimation in a form of a six degrees-of-freedom (6 DOF) transformation between the target image and the source image by inputting the depth estimations ($D_t$, $D_s$), the target image, and the source image into a two-stream network architecture trained to output the 6 DOF transformation based at least in part on the depth estimations ($D_t$, $D_s$), the target image, and the source image; and determine the ego-motion estimation by:

convolving the source image and target image via an appearance stream convolution neural network (CNN);

convolving the depth estimations ($D_t$, $D_s$) via a structure stream CNN; and fusing outputs of the appearance stream CNN and the structure stream CNN into a unified output to produce the 6 DOF transformation.

14. The non-transitory computer-readable medium of claim 13, further including instructions to:

synthesize a predicted image based at least in part on the ego-motion estimation, the depth estimation $D_t$ and the source image;

compare the predicted image against the target image to determine systemic photometric loss; and adjusting parameters of the self-supervised system to reduce the systemic photometric loss by optimizing an associated loss function.

15. The non-transitory computer-readable medium of claim 14, wherein the loss function includes an appearance based matching term defined as a linear combination between an L1 loss and a structural similarity (SSIM) patch-based loss, an edge-aware smoothness loss term, and a mask term that filters out stationary pixels and pixels with little photometric variation.

16. The non-transitory computer-readable medium of claim 13, further including instructions to train a network implementation of the non-transitory computer-readable medium by using training data that is augmented with noise.

17. The non-transitory computer-readable medium of claim 16, wherein the noise comprises random noise patches sized 81×81 to 101×101 at a noise augmentation level of 20%-40% coverage.

* * * * *